United States Patent [19]

Hofmann et al.

[11] Patent Number: 5,164,625

[45] Date of Patent: Nov. 17, 1992

[54] ELECTRIC MOTOR, ESPECIALLY A MOISTURE SEALED COMMUTATOR MOTOR, FOR DRIVING AN AXIALLY FLANGE-MOUNTED HYDRAULIC PUMP

[75] Inventors: Manfred Hofmann, Hettstadt; Werner Seuffert, Bergrheinfeld, both of Fed. Rep. of Germany

[73] Assignee: Siemens Aktiengesellschaft, Berlin & Munich, Fed. Rep. of Germany

[21] Appl. No.: 742,844

[22] Filed: Aug. 8, 1991

[30] Foreign Application Priority Data

Aug. 17, 1990 [EP] European Pat. Off. .......... 90115826

[51] Int. Cl.⁵ .......................... H02K 5/10; H02K 5/12
[52] U.S. Cl. .......................... 310/88; 310/71
[58] Field of Search .............. 310/71, 88, 42, 128, 310/173, 233, 235, 249, 89; 417/405, 410

[56] References Cited

U.S. PATENT DOCUMENTS

| | | | |
|---|---|---|---|
| 3,308,316 | 3/1967 | Pfahl | 310/87 |
| 3,440,594 | 4/1969 | Hopp et al. | 339/59 |
| 4,387,313 | 6/1983 | Yamamoto et al. | 310/71 |
| 4,456,844 | 6/1984 | Yamamoto et al. | 310/87 |
| 4,518,886 | 5/1985 | Kaneyuki | 310/71 |
| 4,727,274 | 2/1988 | Adam et al. | 310/239 |

FOREIGN PATENT DOCUMENTS

| | | |
|---|---|---|
| 0221304 | 5/1987 | European Pat. Off. . |
| 0360623 | 3/1990 | European Pat. Off. . |
| 1613222 | 8/1970 | Fed. Rep. of Germany . |
| 8910214 | 8/1990 | Fed. Rep. of Germany . |
| 2186439 | 8/1987 | United Kingdom . |
| 2225672 | 6/1990 | United Kingdom . |

Primary Examiner—Steven L. Stephan
Assistant Examiner—E. To
Attorney, Agent, or Firm—Kenyon & Kenyon

[57] ABSTRACT

A motor connector line (2) leads to the outside from the brush plate (5) through a duct in the motor housing (1) in an electric motor, especially a commutator motor, to a supply and/or control line via a plug connector. In order to do so in a simple manner, the outer end of the motor connector line (2) is connected with a plastic connector fixed plug (4), which is held by a pot-shaped plastic cover cap (3), which is set onto one end of the motor housing (1) and can be fixed in place on the latter in its end operating position.

20 Claims, 1 Drawing Sheet

5,164,625

ELECTRIC MOTOR, ESPECIALLY A MOISTURE SEALED COMMUTATOR MOTOR, FOR DRIVING AN AXIALLY FLANGE-MOUNTED HYDRAULIC PUMP

BACKGROUND OF THE INVENTION

The invention relates generally to electric motors, especially moisture sealed commutator motors for driving an axially flange-mounted hydraulic pump. More particularly, the present invention relates to such a motor with a motor connector line which passes through the motor housing while maintaining the moisture seal, the exterior end of which motor connector line is connected with a plastic connector plug, which is held by a pot-shaped plastic cover cap, which is set onto one end of the electrical motor housing and can be fixed in place on the latter in its final operating position.

EP-A2-0 360 623 discloses an electric motor for a hydraulic pump which uses the cover cap itself as a moisture-proof seal of the motor housing a its one frontal end, and, at the same time, as an endplate. An integrated plug housing with molded electrical contact lines is provided in one piece with the cover cap, which is injection-molded of plastic. The plug pins of the contact lines project outward and the plug sockets project inward into the motor housing, in such a way that they are contacted with counter-contact pins on the motor side when the cover cap is installed on the motor housing.

EP-A1-0 221 304 discloses a pump motor with a sealed construction and an external connector plug rigidly held in an axial motor housing slit, with its connector lines passed into the motor housing in a sealing manner, by means of a squeezed gasket. In addition, a cover cap which serves exclusively as a seal is set on top of the housing, which is already sealed with a motor endplate on its one frontal side.

DE-U-89 10 214 discloses a motor for driving a hydraulic pump, in which the rotor shaft projects out of the frontal end, sealed with an endplate, of an otherwise pot-shaped motor housing. The motor has an eccentric shaft end which drives the rams of a flange-mounted hydraulic pump. A brush plate for the commutator motor provided as the drive is held in place in the endplate. From the brush plate, the connector line necessary to supply and/or control the commutator motor extends out of the motor housing through a sealed insulating material duct. In this case, outside of the motor housing, the connector line is contacted with a plug by crimping or soldering, and the plug is attached on the motor housing with a clip or a screw attachment.

Plug connectors of these types are relatively difficult to manufacture and assemble. Additionally, these connectors cannot be universally adapted to different customized connectors.

The present invention is directed to the problem of developing a plug connector for the motor connection line of an electric motor, especially a moisture sealed commutator motor, for driving an axially flange-mounted hydraulic pump, which connector plug can be produced with less manufacturing and assembly effort and can be universally adapted to different customized connectors.

SUMMARY OF THE INVENTION

The present invention solves this problem by providing a sealed insulated material duct containing the motor connector line while the motor connector line passes out of the motor housing to a plastic connector fixed plug, which is connected to the exterior end of the motor connector line. Additionally, the present invention provides a pot-shaped plastic cover cap with a pot bottom having an insertion fitting opening holding the plastic connector fixed plug, which cover cap can be locked in place on the motor housing.

The fixed plug is held and secured by means of a plastic cover cap, according to the present invention, which plastic cover cap can be set on top of the motor in simple manner, and attached to it. The plastic cover cap has fitted openings for a connector plug which can be plugged in as a separate component. This allows secure holding of the connector plug without subsequent finishing of and/or damage to the outside surface of the motor housing. In addition, the outside surface of the motor housing can be coated in an advantageous manner, particularly for corrosion protection, while simultaneously allowing ease of interchange of the connector plug with different customized counter-plugs while keeping the remaining motor components unchanged. This corrosion protection can occur as well as ensuring that the motor connector line is passed out of the motor housing while maintaining the moisture seal.

According to another development of the invention, the outer end of the connector line is contacted with plug pins of the fixed plug, and injection-molded or molded into a plug housing of the fixed plug in an insulated manner. For further simplification in terms of production technology, the brush holder, and the connector line which is in contact with the brush holder at one end and in contact with the fixed plug at its other end, are designed as a pre-assembled unit. The preassembled unit can then be fixed in position on the finished, assembled motor by axial placement of the plastic cover cap.

According to another development of the present invention, an axial cover channel provides protection for the motor connector line. And, if necessary, the axial cover channel fixes the position of the motor connector line, which passes out of one of the motor ends and is fixed in place at the other motor end via the fixed plug and the cover cap. The axial cover channel passes over the housing in a sealed manner and is injection-molded onto the cover cap.

DETAILED DESCRIPTION

Figure 1:
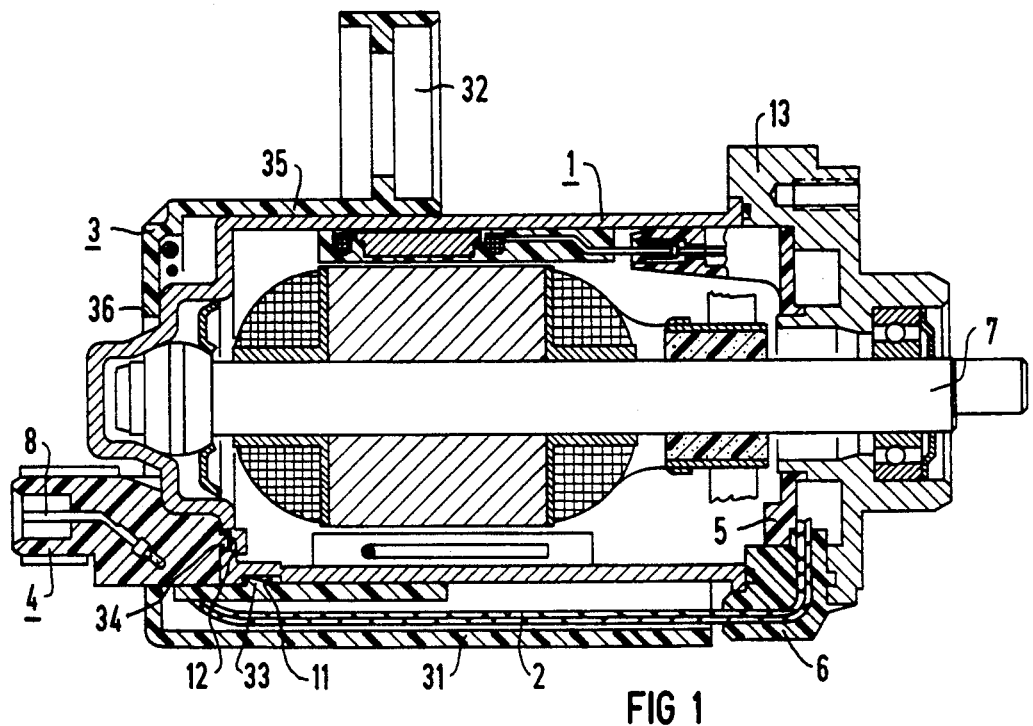
FIG. 1 shows an axial longitudinal cross-section through a commutator motor, intended to drive a hydraulic pump unit.
Figure 2:
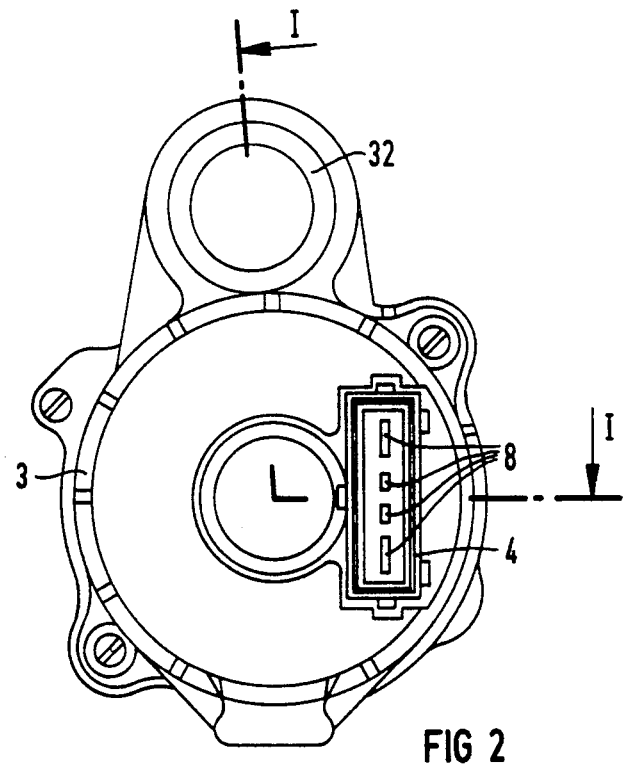
FIG. 2 shows an axial top view of the left frontal side of the drive motor according to FIG. 1.

FIGS. 1 and 2 show a commutator motor with a pot-shaped motor housing 1, which projects out of the right frontal side sealed off with an endplate 13. The commutator motor has a rotor shaft 7 with an extended end, and drives the pump rams (not shown) of a hydraulic pump of an anti-locking brake system for a motor vehicle. The end of the rotor shaft is flange-mounted on the endplate 13, with an eccentric end. From the right end of the motor housing 1, i.e. the endplate 13, a connector line 2 in contact via interior ends with a brush plate 5 is passed out through a sealed insulating material duct 6 and along the outside surface of the motor housing 1 to a fixed plug 4 on the other side of the commutator motor. The connector line 2, which is a single preassembled component, is placed in contact with plug pins 8 in a plug housing of the fixed plug 4. The connector 2 line is also molded in an insulated manner. To secure the fixed plug 4 in place with the pre-assembled or pre-contacted connector line, a pot-shaped plastic cover cap 3 is set onto the motor housing 1 from the left end, after the motor is completely assembled. The pot-shaped plastic cover cap 3 is placed in such a manner that the plastic cover cap 3 rests tightly against the motor housing 1. Cover channel 31 protects the connector line 2 along its progression parallel to the outside circumference surface of the motor housing 1.

Projecting catch projections 33, 34 on the plastic cover cap 3 or on the fixed plug 4 are used for tangential and axial securing of the position of the cover cap 3 and/or the fixed plug 4 relative to the motor housing 1. These catch projections 33, 34 engage and form a positive lock in corresponding recesses 11, 12 on the motor housing 1 when the plastic cover cap is in its locked position. In the present case, several recesses 11 distributed over the circumference of the motor housing 1 are provided for corresponding catch projections 33 which snap into place, to ensure axial attachment. A recess 12 for a corresponding plug-in, pin-shaped catch projection 34 is provided on the fixed plug 4 to ensure radial attachment. It is advantageous if these recesses 11, 12 are coated with a powder coating before finishing the corrosion protection of the motor housing, for example, and coated with a protective layer, which is not damaged when the position of the fixed plug 4 is secured and the cover cap 3 is set on and locked in place. A hanging strap 32 to secure the motor unit is injection-molded onto the cover cap 3, forming a single piece with the cover cap.

What is claimed is:

1. A moisture sealed electric motor for driving an axially flange-mounted hydraulic pump, said electric motor comprising:
   a) a motor housing having a first end and a second end;
   b) a motor connector line passing through the motor housing while maintaining the moisture seal, and having an exterior end and interior section;
   c) a plastic connector fixed plug, connected to the exterior end;
   d) a pot-shaped plastic cover cap having a pot bottom with an insertion fitting opening, said pot-shaped plastic cover cap holding the plastic connector fixed plug, being disposed onto the first end of the motor housing and being fixable in place on the motor housing in a locked position, wherein said plastic connector fixed plug is inserted into the insertion fitting opening; and
   e) a sealed insulating material duct containing the motor connector line while said motor connector line passes out of the motor housing to the plastic connector fixed plug.

2. The electric motor according to claim 1, wherein said plastic connector fixed plug further comprises a plug housing and a pair of plug pins contacting the exterior end of the connector line, and said exterior end is molded into and insulated in the plug housing in an insulated manner.

3. The electric motor according to claim 1, further comprising an endplate having a brush holder disposed in said endplate inside the electric motor, said brush holder coupled with the interior section of the motor connector line, wherein said brush holder, said motor connector line with said insulating material duct and said fixed plug comprise a single unit that can be pre-assembled.

4. The electric motor according to claim 2, further comprising an endplate having a brush holder disposed in said endplate inside the electric motor, said brush holder coupled with the interior section of the motor connector line, wherein said brush holder, said motor connector line with said insulating material duct and said fixed plug comprise a single unit that can be pre-assembled.

5. The electric motor according to claim 1, further comprising a drive for a hydraulic pump projecting axially at said first end, and a brush plate mounted inside the housing at said first end, wherein said pot-shaped plastic cover cap is axially disposed on said second end.

6. The electric motor according to claim 2, further comprising a drive for a hydraulic pump projecting axially at a first end, and a brush plate mounted inside the housing at said first end, wherein said pot-shaped plastic cover cap is axially disposed on said second end.

7. The electric motor according to claim 3, further comprising a drive for a hydraulic pump projecting axially at a first end, and a brush plate mounted inside the housing at said first end, wherein said pot-shaped plastic cover cap is axially disposed on said second end.

8. The electric motor according to claim 4, further comprising a drive for a hydraulic pump projecting axially at a first end, and a brush plate mounted inside the housing at said first end, wherein said pot-shaped plastic cover cap is axially disposed on said second end.

9. The electric motor according to claim 1, further comprising an axial cover channel, connecting with the pot-shaped plastic cover cap, and injection-molded with said pot-shaped plastic cover cap, wherein said motor connection line further comprises a section which runs along the motor housing between the insulated material duct and the pot-shaped plastic cover cap, and said axial cover channel protects said section.

10. The electric motor according to claim 2, further comprising an axial cover channel, connecting with the pot-shaped plastic cover cap, and injection-molded with said pot-shaped plastic cover cap, wherein said motor connection line further comprises a section which runs along the motor housing between the insulated material duct and the pot-shaped plastic cover cap, and said axial cover channel protects said section.

11. The electric motor according to claim 3, further comprising an axial cover channel, connecting with the pot-shaped plastic cover cap, and injection-molded with said pot-shaped plastic cover cap, wherein said motor connection line further comprises a section which runs along the motor housing between the insulated material duct and the pot-shaped plastic cover cap, and said axial cover channel protects said section.

12. The electric motor according to claim 1, further comprising a means for tangentially securing the pot-shaped plastic cover cap in a locked position, or securing the plastic connector fixed plug relative to the motor housing.

13. The electric motor according to claim 12, wherein said means for tangentially securing comprise a catch projection and a recess.

14. The electric motor according to claim 1, further comprising a means for axially securing the pot-shaped plastic cover cap in a locked position, or securing the plastic connector fixed plug relative to the motor housing.

15. The electric motor according to claim 14, wherein said means for axially securing comprise a catch projection and a recess.

16. The electric motor according to claim 1, further comprising a means for radially securing the pot-shaped plastic cover cap in a locked position, or securing the plastic connector fixed plug relative to the motor housing.

17. The electric motor according to claim 16, wherein said means for radially securing comprise a catch projection and a recess.

18. The electric motor according claim 1, further comprising a means for attaching the motor drive which is molded on said motor housing.

19. A moisture sealed commutator motor for driving an axially flange-mounted hydraulic pump, said commutator motor comprising:
   a) a motor housing having a first end and a second end;
   b) a motor connector line passing through the motor housing while maintaining a moisture seal, and having an exterior end and an interior section;
   c) a plastic connector fixed plug, connected to the exterior end;
   d) a pot-shaped plastic cover cap having a pot bottom with an insertion fitting opening, said pot-shaped plastic cover cap holding the plastic connector fixed plug, being disposed onto the first end of the motor housing and being fixable in place on the motor housing in a locked position, wherein said plastic connector fixed plug is inserted into the insertion fitting opening;
   e) a sealed insulating material duct containing the connector line while it passes out of the motor housing to the plastic connector fixed plug; and
   f) an endplate having a brush holder disposed in said endplate inside the commutator motor, said brush holder coupled with the interior section of the motor connector line, wherein said brush holder, said motor connector line with said insulated material duct and said fixed plug comprise a single unit which can be pre-assembled.

20. The commutator motor according to claim 19, wherein plastic connector fixed plug further comprises a plug housing and a pair of plug pins contacting the exterior end of the connector line, and said exterior end is molded into and insulated in the plug housing.

* * * * *